US011332952B2

(12) United States Patent
Porm et al.

(10) Patent No.: US 11,332,952 B2
(45) Date of Patent: *May 17, 2022

(54) SUBSECTION OF A TOWER SECTION, A TOWER AND A METHOD FOR MANUFACTURING A SUBSECTION OF A TOWER SECTION

(71) Applicant: ENO Energy Systems GmbH, Rostock (DE)

(72) Inventors: Karsten Porm, Kroepelin (DE); Stefan Bockholt, Kuehlungsborn (DE); Klaus Jakowski, OT Niekrenz (DE); Robin Ahrens, Rostock (DE); Michael Bull, Kritzmow OT Groß Schwass (DE)

(73) Assignee: eno energy systems GmbH, Rostock (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/836,962

(22) Filed: Apr. 1, 2020

(65) Prior Publication Data
US 2020/0224442 A1 Jul. 16, 2020

Related U.S. Application Data

(62) Division of application No. 15/738,133, filed as application No. PCT/EP2016/064625 on Jun. 23, 2016, now Pat. No. 10,641,000.

(30) Foreign Application Priority Data

Jun. 26, 2015 (DE) .................... 10 2015 110 344.3

(51) Int. Cl.
*E04H 12/08* (2006.01)
*E04H 12/34* (2006.01)
*E02D 27/42* (2006.01)

(52) U.S. Cl.
CPC ......... *E04H 12/085* (2013.01); *E02D 27/425* (2013.01); *E04H 12/342* (2013.01); *F05B 2240/9121* (2013.01)

(58) Field of Classification Search
CPC ... E04H 12/085; E04H 12/342; E02D 27/425; F05B 2240/9121; F03D 13/20
(Continued)

(56) References Cited

U.S. PATENT DOCUMENTS 3,193,129 A * 7/1965 Pfluger .................. B65D 90/08
220/4.16
6,715,243 B1 * 4/2004 Fons ......................... E04H 7/30
220/4.12

(Continued)

FOREIGN PATENT DOCUMENTS

DE        10126049 A1 * 12/2002 ............. F03D 13/10
WO   WO-2014086170 A1 *  6/2014 ............. F03D 13/20

OTHER PUBLICATIONS

Machine translation of foreign reference EP2824257, obtained from https://worldwide.espacenet.com/patent/search/family/050630583/publication/EP2824257A1?q=EP2824257 (last accessed on Apr. 23, 2021) (Year: 2021).*

*Primary Examiner* — Theodore V Adamos
(74) *Attorney, Agent, or Firm* — 2SPL Patent Attorneys PartG mbB; Kieran O'Leary

(57) ABSTRACT

A subsection of a tower section comprises a shell segment of the tower section and at least a longitudinal flange mounted to a longitudinal side of the shell segment for connecting to a longitudinal flange of a further subsection of the tower section. Here, the longitudinal flange comprises a part of a surface contour extending from a contact surface of the longitudinal flange which is provided for a connection to a longitudinal flange of a further subsection to a connecting surface connected to the shell segment. The part of the (Continued)

surface contour comprises a distance to a contacting plane passing through the contact surface.

11 Claims, 19 Drawing Sheets

(58) Field of Classification Search
USPC .......................................................... 290/55
See application file for complete search history.

(56) References Cited

U.S. PATENT DOCUMENTS

| | | | |
|---|---|---|---|
| 9,677,543 B2* | 6/2017 | Kamibayashi | F03D 13/10 |
| 2004/0006941 A1* | 1/2004 | Brinker | E04C 3/32 |
| | | | 52/309.4 |
| 2004/0112002 A1* | 6/2004 | Wobben | E04H 12/34 |
| | | | 52/831 |
| 2006/0123735 A1* | 6/2006 | Fuellhaas | F03D 13/20 |
| | | | 52/741.13 |
| 2006/0272244 A1* | 12/2006 | Jensen | F03D 13/20 |
| | | | 52/223.5 |
| 2010/0058673 A1* | 3/2010 | Numajiri | E04H 12/085 |
| | | | 52/40 |
| 2010/0117353 A1* | 5/2010 | Ma | E04H 12/28 |
| | | | 285/64 |
| 2011/0131898 A1* | 6/2011 | Nies | F16B 5/0241 |
| | | | 52/173.1 |
| 2013/0000241 A1* | 1/2013 | Jensen | F03D 80/00 |
| | | | 52/651.01 |
| 2015/0308097 A1* | 10/2015 | Kosuri | F03D 13/10 |
| | | | 52/698 |

* cited by examiner

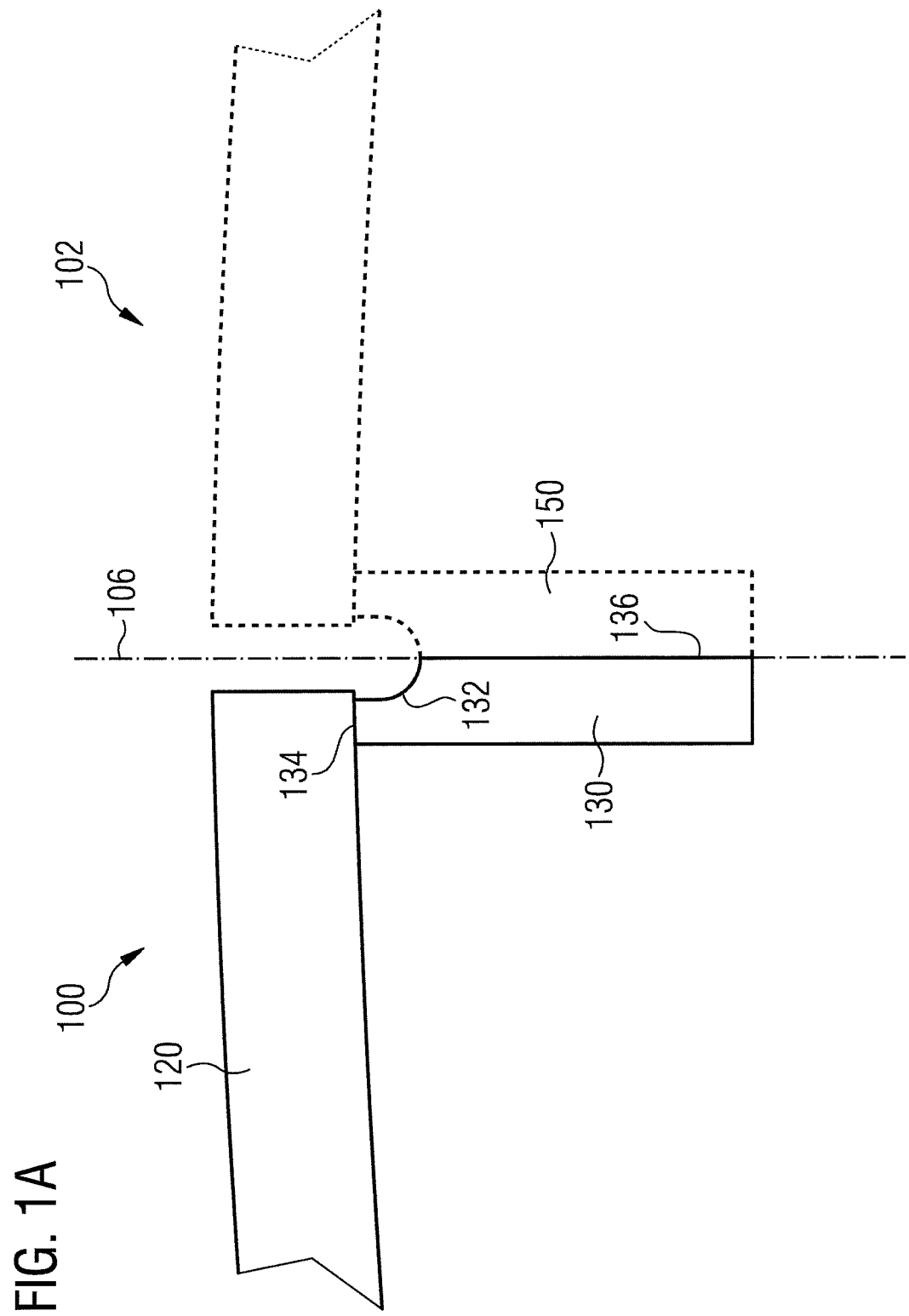

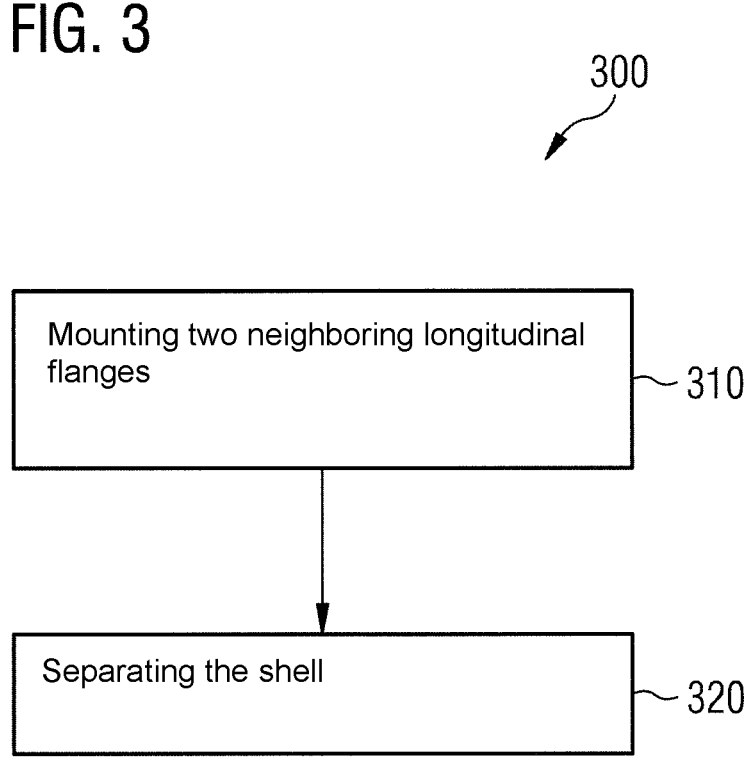

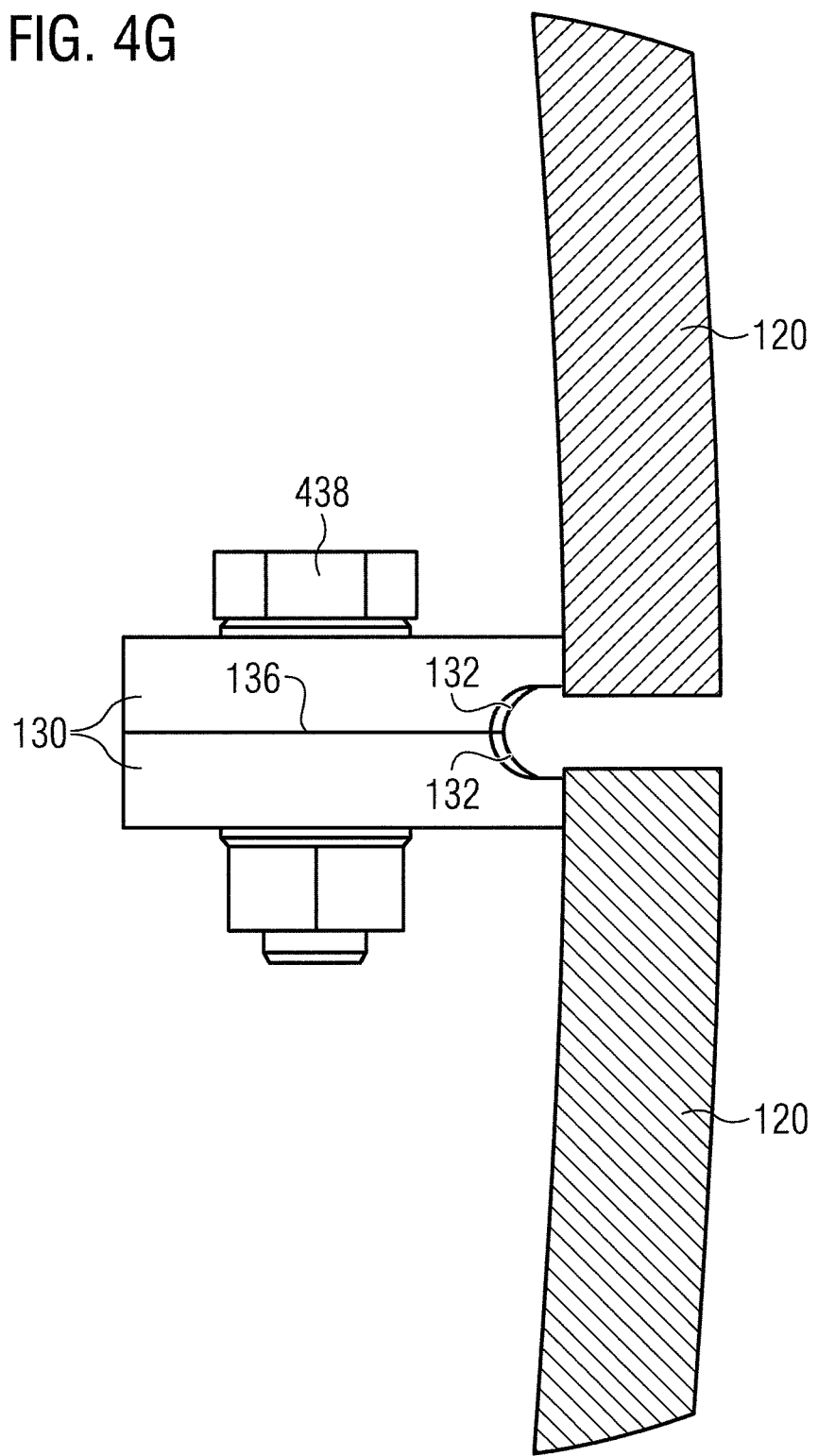

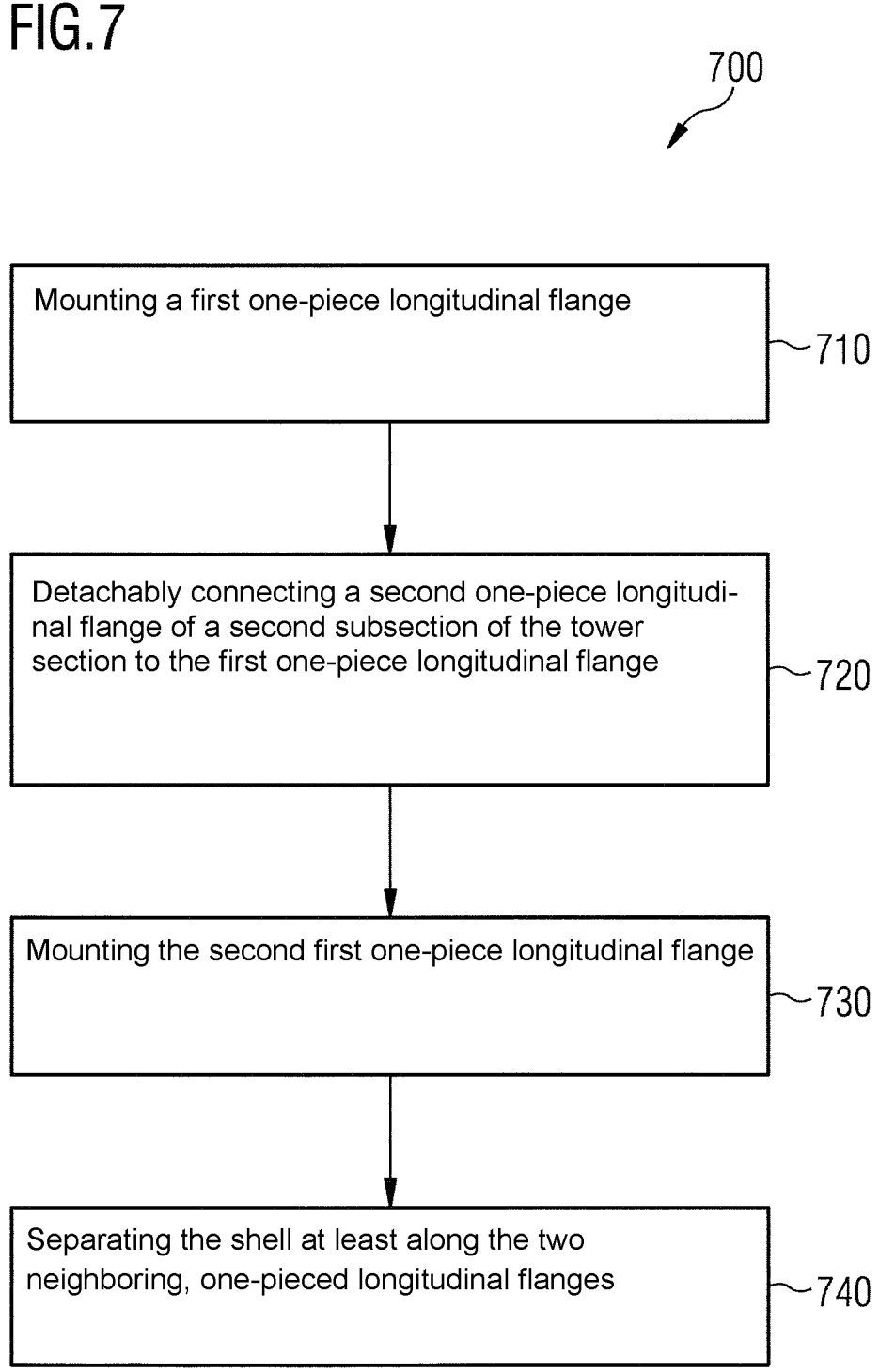

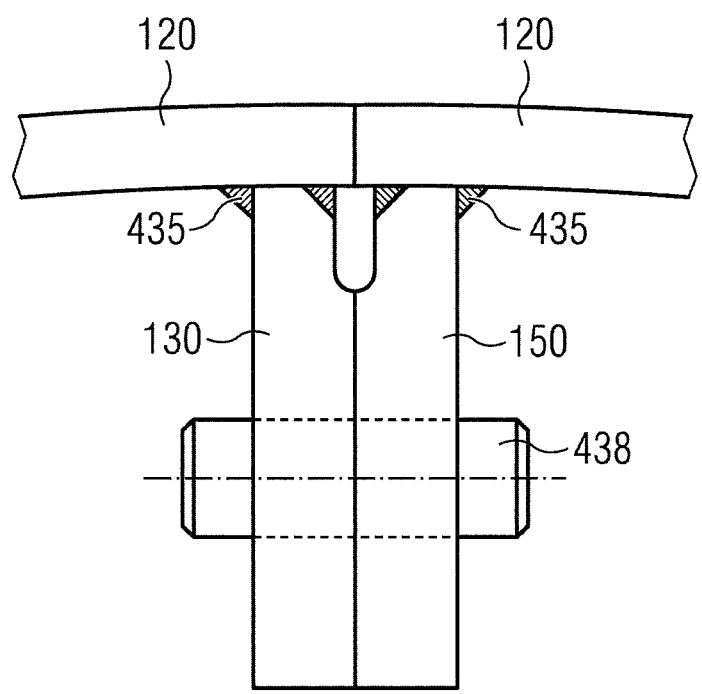

SUBSECTION OF A TOWER SECTION, A TOWER AND A METHOD FOR MANUFACTURING A SUBSECTION OF A TOWER SECTION

CROSS-REFERENCE TO RELATED APPLICATIONS

This application is a divisional of U.S. application Ser. No. 15/738,133, filed Dec. 20, 2017, which was a 35 U.S.C. § 371(c) national stage entry of PCT/EP2016/064625, filed Jun. 23, 2016. PCT/EP2016/064625 claimed priority to German Application 10 215 110 344.3, filed Jun. 26, 2015. The contents of the earlier filed applications are incorporated by reference herein in their entirety.

BACKGROUND

Examples relate to concepts for manufacturing and constructing towers and subsections of towers and, in particular, to a subsection of a tower section, a tower and a method for manufacturing a subsection of a tower section.

In many fields of technology and construction, members, machines, plants and systems are used whose components are partially several ten meters long and may not be decomposed any further for different reasons. Examples come from many different areas and include, for example, tower members, mechanically particularly stressed carriers, process containers, rotor blades for wind turbines, airfoils for aircrafts, drive shafts for watercraft vehicles and other corresponding longitudinal members, to only mention a few.

In particular when transporting these and similar components frequently problems occur when the respective members are to be transported over land to inland locations or loading locations. Thus, for example, height limitations during transport or also problems relating to bend radiuses may result due to the length of the corresponding members. During overland transport, for example due to bridge passages maximum pass-through heights may have to be considered. But also due to the length of the corresponding members of sometimes several ten meters in case of a lying transport a minimum curve radius may frequently not be undercut, which may for example lead to problems when transporting on roads.

In particular for the generation of energy from wind, turbines with high towers are built. Due to increasing wind speeds at increasing heights, higher yields may be achieved with higher hub heights. In this respect, conventionally wind turbines with tower heights of frequently more than 100 m are achieved in steel, concrete, wood or hybrid towers using tube or lattice construction.

Due to the comparatively low mass and costs, tubular steel towers are preferred. Due to mass and size limitations on transport paths, such towers may not be transported in one piece, however. Consequently, several tower sections with a length of each less than 30 m and an individual mass of usually less than 100 t are manufactured and connected to each other at the construction site. Such tower sections are usually limited to a diameter of 4.0-4.5 m suitable for bridge passages.

In particular for large plants such a diameter limitation may not be made compatible with the occurring loads for a stability check. Consequently it is frequently necessary to increase the diameter at least in the bottom area of the tower so that a transport as a tubular section is not possible. Such sections either have to be limited regarding their length so that they may be transported upright or they have to be additionally separated longitudinally. The assembly of a tower consisting of several parts may lead to problems in calculation and the proof of stability.

There may be a demand for providing a concept for manufacturing and constructing towers and subsections of towers so that an improvement of stability, a facilitated transport and/or a facilitated mounting and/or manufacturing are enabled.

This demand may be solved by the subject matters of any of the claims.

SUMMARY

Some embodiments relate to a subsection (part) of a tower section. A subsection comprises a shell segment of the tower section and at least a longitudinal flange mounted to a longitudinal side of the shell segment for connecting to a longitudinal flange of a further subsection of the tower section. Here, the longitudinal flange comprises a part of a surface contour extending from a contact surface of the longitudinal flange which is provided for a connection to a longitudinal flange of a further subsection to a connecting surface connected to the shell segment. The part of the surface contour comprises a distance to a contacting plane passing through the contact surface.

Using the subsections described above or below, the manufacturing and/or the transport of tower sections may be substantially facilitated, as the shell of the tower section may simply be divided into several parts along the longitudinal flanges in the factory and then be assembled again at the setup location comprising basically the same geometry.

A tower section is e.g. a part of a tower which, for example, comprises a symmetry with respect to a substantially vertical tower axis. For example, the tower section (the shell of the tower section) may basically comprise a cylinder barrel-shaped or truncated cone jacket-shaped geometry.

The subsection of the tower section is, for example, generated when separating the shell of the tower section into smaller parts. Accordingly, the subsection includes a segment of the shell of the tower section. The shell segment for example includes two basically horizontally (or orthogonally to a tower axis or symmetry axis of the tower section) extending transverse sides and two longitudinal sides extending basically orthogonally to the transverse sides (e.g. basically vertically or towards the tower axis). The longitudinal sides e.g. for hollow cylinder-shaped tower sections may basically be parallel to the tower axis or slightly deviate from the parallel direction for hollow truncated cone-shaped tower sections (e.g. by less than 3° or less than 1°). The shell segment may e.g. comprise a form which basically forms part of a cylinder barrel-shaped or truncated cone jacket-shaped geometry. The shell segment is for example part of the outer shell of the tower and may e.g. be made of steel. The transverse side of the shell segment may for example comprise a length of more than 4 m (or more than 6 m or more than 8 m). The longitudinal side of the shell segment may e.g. comprise a length of more than 5 m (or more than 10 m or more than 20 m). The shell segment may for example comprise a thickness of more than 25 mm (or more than 35 mm or more than 50 mm).

The subsection of the tower section further includes at least a longitudinal flange. The longitudinal flange is mounted to a longitudinal side of the shell segment (e.g. by a welding seam). The longitudinal flange may be mounted to an exterior side or interior side of the shell segment.

Below the surface contour of the longitudinal flange for example the shape of the complete surface of the longitudinal flange may be imminent. For example, the contact surface of the longitudinal flange which is provided for a connection to a longitudinal flange of a further subsection and the connecting surface via which the longitudinal flange is connected to the shell segment are part of the surface contour. The contact surface is for example a basically flat surface which is in direct contact with the longitudinal flange of a further subsection when assembling the tower section from several subsections.

In one part extending from a contact surface of the longitudinal flange which is provided for a connection to a longitudinal flange of a further subsection to the connecting surface connected to the shell segment, the surface contour comprises a distance to the contacting plane passing through the contact surface. The contacting plane is e.g. a virtual plane substantially (e.g. neglecting unevennesses of the contact surface) passing through the contact surface of the longitudinal flange. The distance to the contacting plane may for example increase erratically, continuously, linearly or in any different way from the contact surface towards the shell segment. For example, the part of the surface contour of the longitudinal flange arranged between the contact surface and the connecting surface may comprise a distance of more than 1.5 mm (or more than 3 mm or more than 5 mm) to an end adjacent to the connecting surface connected to the shell segment. Due to the distance to the contacting plane, for example, a gap results between the end of the longitudinal flange and the longitudinal flange of a further subsection when the subsections are connected to each other. Due to the described surface contour, for example the arrangement of a spacer member between two longitudinal flanges of subsections to be connected may be avoided. The longitudinal flange of the subsection may be implemented in one piece. In this way subsections with a low number of members may easily be manufactured.

For example, the part of the surface contour of the longitudinal flange arranged between the contact surface and the connecting surface forms a notch or an undercut-shaped recess. An undercut-shaped recess for example hast basically the same geometry as an undercut but the longitudinal flange is not a rotation-symmetric member as it is usually the case with an undercut.

The longitudinal flange may for example have a smaller thickness at an end facing the shell segment than in an area of the contact surface. Alternatively, the longitudinal flange may be bent away from the contacting plane between the contact surface and the connecting surface and comprise a substantially constant thickness.

It may be sufficient to use only a longitudinal flange of the subsection with the described surface contour. Alternatively, a longitudinal flange each with the described surface contour may be arranged at both longitudinal sides of the shell segment.

The longitudinal flange may extend across the complete longitudinal side of the shell segment of the subsection. Alternatively, the longitudinal flange may be shorter than the longitudinal side of the shell segment such that at least at the ends of the longitudinal side no longitudinal flange extends (e.g. along at least the last 10 cm, at least the last 30 cm or at least the last 50 cm). By this, mounting a transversal flange along a transverse side of the shell segment of the subsection may be facilitated.

The subsection may optionally comprise a basically circle segment-shaped transversal flange. The transversal flange may be mounted to a transverse side of the shell segment of the subsection. Further, optionally also on both transverse sides of the shell segment of the subsection one transversal flange each may be mounted. The transversal flange may be used to connect the subsection of a different tower section, a subsection of a different tower section or a foundation (e.g. by screws).

Optionally, in the shell segment of the subsection a door opening may be provided.

More details and optional aspects of the described subsection of the tower section are mentioned in connection with the proposed concept or one or more embodiments described in the following (e.g. FIGS. 1 to 6).

Some embodiments relate to a tower with a plurality of tower sections. Here, at least one tower section comprises at least two subsections, according to any of the embodiments above or below. The longitudinal flange of a first subsection of the at least two subsections is directly connected to a longitudinal flange of a second subsection of the at least two subsections. Further, between the shell segment of the first subsection and the shell segment of the second subsection a gap exists.

E.g. a vertically aligned building is designated as a tower, for example for a wind turbine. The definition of a tower contains both braced and also free-standing constructions and consequently also considers constructions which are sometimes referred to as a mast. For example, the tower may be a tower of a wind mill.

In the gap between the shell segment of the first subsection and the shell segment of the second subsection a sealing element (e.g. a T-shaped sealing element) may be arranged.

More details and optional aspects of the described tower are mentioned in connection with the proposed concept or one or more embodiments described above or below (e.g. FIGS. 1 to 6).

Some further embodiments relate to a method for manufacturing at least a subsection of a tower section. The method comprises mounting two neighboring, one-piece longitudinal flanges to a shell of a tower section, so that the two neighboring, one-piece longitudinal flanges are directly in contact with one another along a contact surface. Further, the method comprises separating the shell at least along the two neighboring, one-piece longitudinal flanges. Here, at least after separating at the two neighboring, one-piece longitudinal flanges a gap exists between the ends of the two neighboring, one-piece longitudinal flanges facing the shell.

Due to the possibility of generating a gap during separation or due to the existence of a gap already before separation separating the shell of the tower section may be clearly facilitated.

The longitudinal flanges may for example be connected to the shell by welding. It may be sufficient here to provide a welding seam at one side each facing away from the respective other longitudinal flange. Optionally, after separating, also on the opposite side a welding seam may be provided. The optional welding seam on the opposite side may be enabled by the existing gap as there is for example sufficient room for the welding seam due to the gap.

The longitudinal flanges are mounted to the shell so that the contact surfaces of the longitudinal flanges are in direct contact with one another. Thus, for example, an intermediate member or spacer member is arranged between the longitudinal flanges.

The gap between the ends of the two neighboring one-piece longitudinal flanges may already exist after mounting and before separating at the ends of the two neighboring one-piece longitudinal flanges facing the shell. In this respect, one or both of the neighboring, one-piece longitudinal flanges may for example comprise a surface contour as described above or illustrated in the following figures. The ends of the two longitudinal flanges are for example those parts of the longitudinal flanges which are arranged closer than 5 cm or closer than 2 cm or closer than 1 cm to the shell. For example the gap between the two neighboring longitudinal flanges may be larger than a gap generated by the separation between the at least two shell segments. By this, for example, the shell may be separated without damaging the longitudinal flanges by the separating tools.

For example, the gap between the two neighboring longitudinal flanges may be more than 5 mm (or more than 1 cm or more than 2 cm) larger than the gap between the shell segments of the at least two subsections. The gap between the ends of the two neighboring longitudinal flanges may for example be larger than 3 mm (or larger than 6 mm or larger than 1 cm) and/or smaller than 5 cm (or smaller than 2 cm). The gap between the shell segments of the at least two subsections may for example be larger than 1 mm (or larger than 2 mm or larger than 5 mm) and/or smaller than 1 cm (or smaller than 5 mm).

Alternatively, the shell may be separated so that the gap exists between the ends of the two neighboring, one-piece longitudinal flanges after separating at the ends of the two neighboring, one-piece longitudinal flanges facing the shell. Here, for example, the separating tool (e.g. a saw) cuts through the shell down into the longitudinal flanges. The longitudinal flanges may comprise a larger thickness than a gap generated by the separation, so that the gap between the generated shell segments may extend into the longitudinal flanges.

The two neighboring longitudinal flanges may be connected to each other by a detachable connection during the separation of the shell (e.g. screws or stitching together by weld technique). The subsections of the tower section may be separated from each other by detaching the connection and be provided to the location of assembly separately. At the location of assembly the subsections may again be connected to each other via the longitudinal flanges.

More details and optional aspects of the described methods are mentioned in connection with the proposed concept or one or more embodiments described above or below (e.g. FIGS. 1 to 6).

BRIEF DESCRIPTION OF THE FIGURES

In the following, with reference to the accompanying figures, examples are described and explained in more detail.

FIG. 1A shows a schematic illustration of a subsection of a tower section;

FIG. 3 shows a flow chart of a method for manufacturing a subsection of a tower section;

FIG. 4G shows a schematic cross section of two neighboring longitudinal flanges after separating the shell;

FIG. 7 shows a flow chart of a method for manufacturing a tower section; and

FIG. 8A-8I show schematic cross sections of parts of a tower section at different stages during the manufacturing of the tower section.

DETAILED DESCRIPTION

Figure 1B:
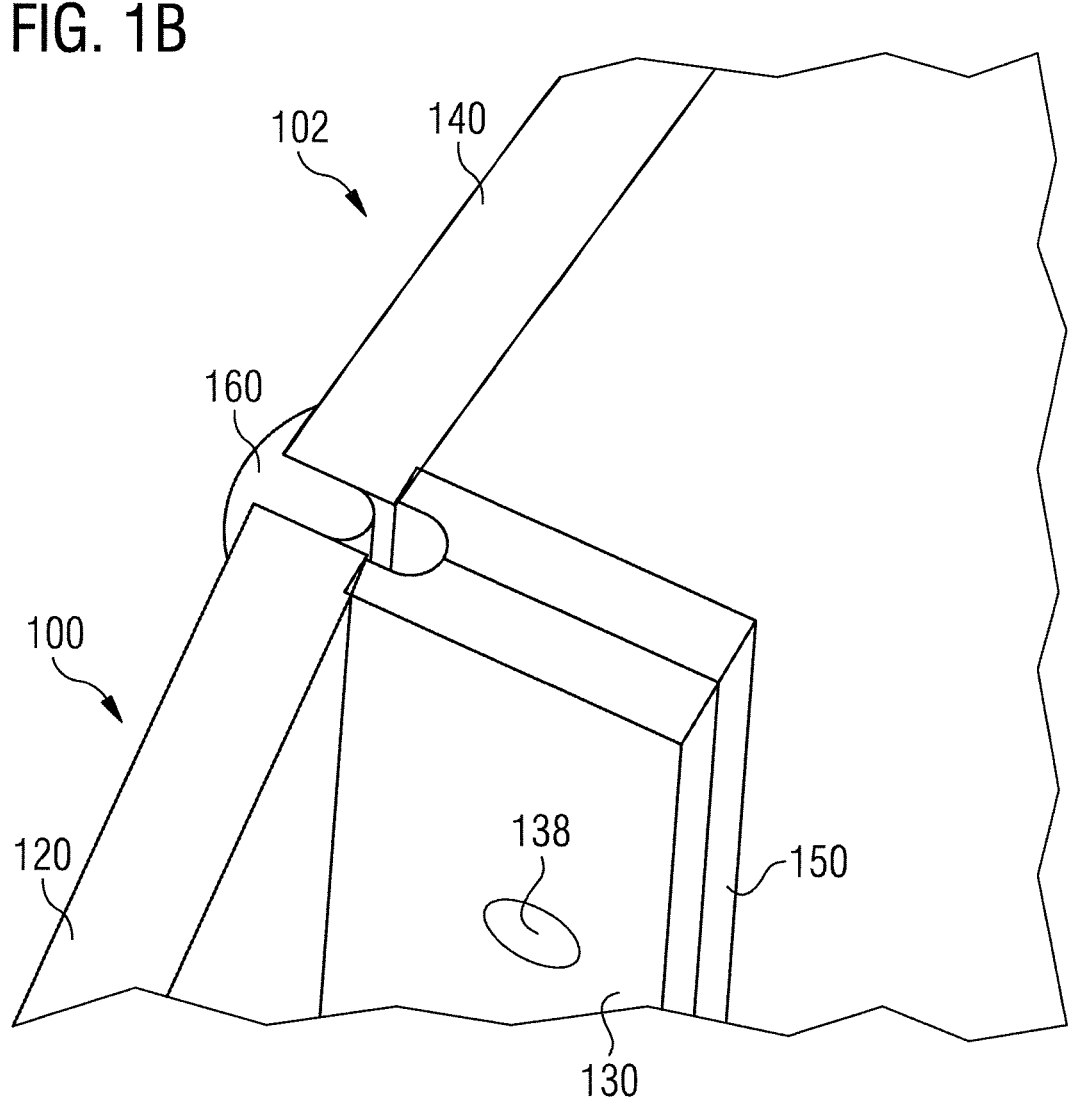
FIG. 1B shows a schematic illustration of an interconnect location of two subsections of a tower section.

Some examples are described now in more detail with reference to the accompanying figures. In the figures, the thicknesses of lines, areas, layers and/or regions may be exaggerated for clarity.

Like reference signs refer to like or similar components throughout the following description of the included figures, which merely show some examplary embodiments. Moreover, summarizing reference signs will be used for components and objects which occur several times in one example or in one figure but are described commonly with respect to one or several features. Components and objects described with like or summarizing reference signs may be implemented alike or also differently, if applicable, with respect to one or more or all the features, e.g. their dimensioning, unless explicitly or implicitly stated otherwise in the description.

Although examples may be modified and changed in different ways, only some examples are presented in detail in the figures and in the present description. It is to be clarified, however, that is not the object to restrict examples to the respectively disclosed forms, but to the contrary, that examples are to cover all structural modifications, equivalents, and alternatives falling within the scope of the invention. Same reference numerals designate same or similar elements throughout the complete description of the figures, as explained above.

FIG. 1A shows a schematic illustration of a subsection 100 of a tower section. The subsection 100 of the tower section comprises a shell segment 120 of the tower section and at least a longitudinal flange 130 mounted to a longitudinal side of the shell segment 120 for connecting to a longitudinal flange 150 of a further subsection 102 of the tower section. Here, the longitudinal flange 130 comprises a part 132 of a surface contour extending from a contact surface 136 of the longitudinal flange 130 which is provided for a connection to a longitudinal flange of 150 a further subsection 102 to a connecting surface 134 connected to the shell segment 120. The part 132 of the surface contour comprises a distance to a contacting plane 106 passing through the contact surface 136.

The part 132 of the surface contour for example has an increasing distance from the contact surface 136 provided for a connection to the longitudinal flange 150 of the further subsection 102 to the connecting surface 134 connected to the shell segment 120.

For example, the longitudinal flange 130 comprises a smaller thickness at an end facing the shell segment 120 than in an area of the longitudinal flange 130 which is in contact with the longitudinal flange 150 of the further subsection 102 when connecting to the longitudinal flange 150 of the further subsection 102.

More details and optional aspects of the subsection of the tower section illustrated in FIG. 1A are mentioned in connection with the proposed concept or one or more embodiments described above or below (e.g. FIGS. 2 to 6).

FIG. 1B shows a schematic illustration of an interconnect location of two subsections 100, 102 of a tower section. The subsections 100, 102 each comprise a shell segment 120, 140 and at least one longitudinal flange 130, 150. The longitudinal flanges 130, 150 comprise holes 138 for connecting the longitudinal flanges (e.g. by screws). Further, between the ends of the longitudinal flanges 130, 150 facing the shell segments 120, 140 a gap exists. Likewise, between the two shell segments 120, 140 a gap is arranged. Additionally, in the gap between the shell segments 120, 140 a substantially T-shaped sealing element is arranged for sealing the gap.

For example, FIG. 1B shows a situation after the assembly (screws not illustrated).

More details and optional aspects of the subsection of the tower section illustrated in FIG. 1B are mentioned in connection with the proposed concept or one or more embodiments described above or below (e.g. FIGS. 2 to 6).

Figure 2:
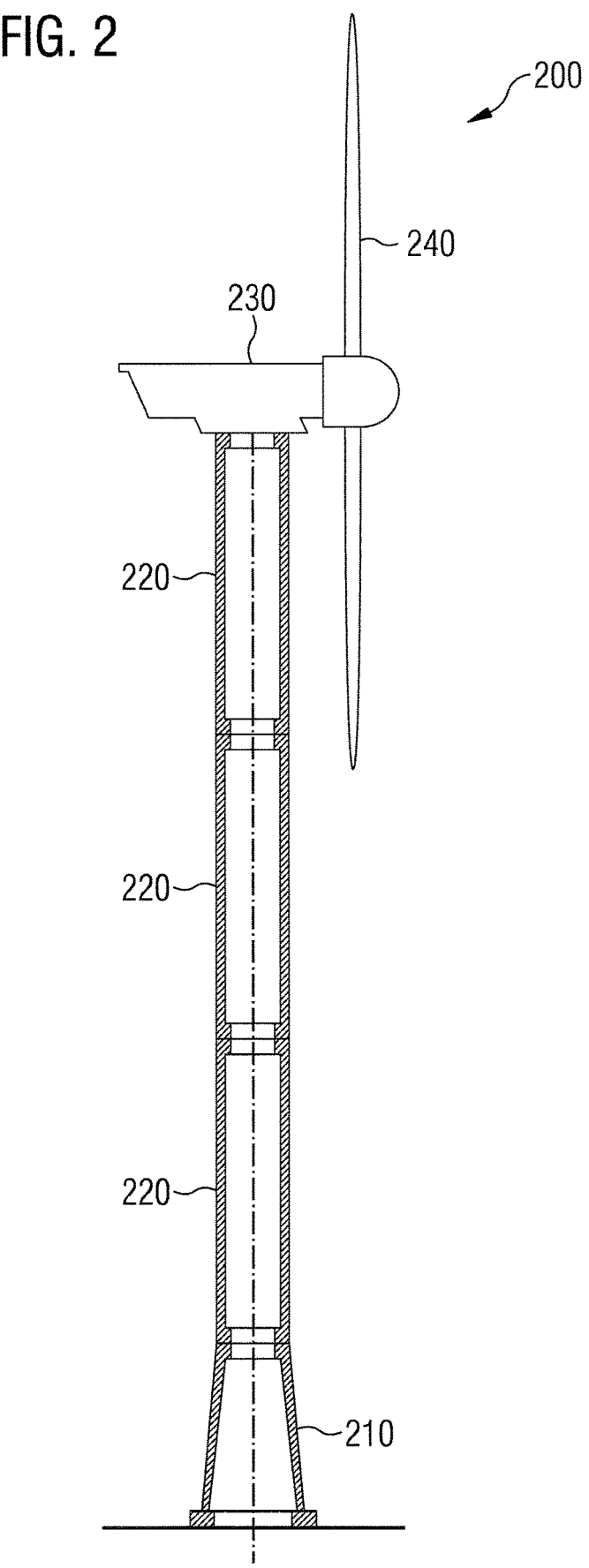
FIG. 2 shows a schematic cross section of a wind turbine.

FIG. 2 shows a schematic cross section of a wind turbine 200 according to an embodiment. The wind turbine 200 comprises a tower and a machine house 230 with a connected rotor 240. The tower includes a hollow truncated cone-shaped lower tower section 210 and three hollow cylindrical top tower sections 220. At least the lower tower section 210 includes two subsections as described in the above described concept or in connection with one or more embodiments described above or below (e.g. FIG. 1 or 3 to 4G). For example, the subsections and/or tower sections may be connected to each other by screwing or by a welding method at the location of assembly.

More details and optional aspects of the tower or a tower section are mentioned in connection with the proposed concept or one or more embodiments described above or below (e.g. FIG. 1 or 3 to 4G).

FIG. 3 shows a flow chart of a method for manufacturing at least one subsection of a tower section. The method 300 comprises mounting 310 two neighboring, one-piece longitudinal flanges to a shell of a tower section, so that the two neighboring, one-piece longitudinal flanges are directly in contact with one another along a contact surface. Further, the method comprises separating 320 the shell at least along the two neighboring, one-piece longitudinal flanges. Here, at least after separating, at the two neighboring, one-piece longitudinal flanges a gap exists between the ends of the two neighboring, one-piece longitudinal flanges facing the shell.

More details and optional aspects of the method 300 are mentioned in connection with the proposed concept or one or more embodiments described above or below (e.g. FIG. 1 to 2 or 4A to 4G).

Figure 4A:
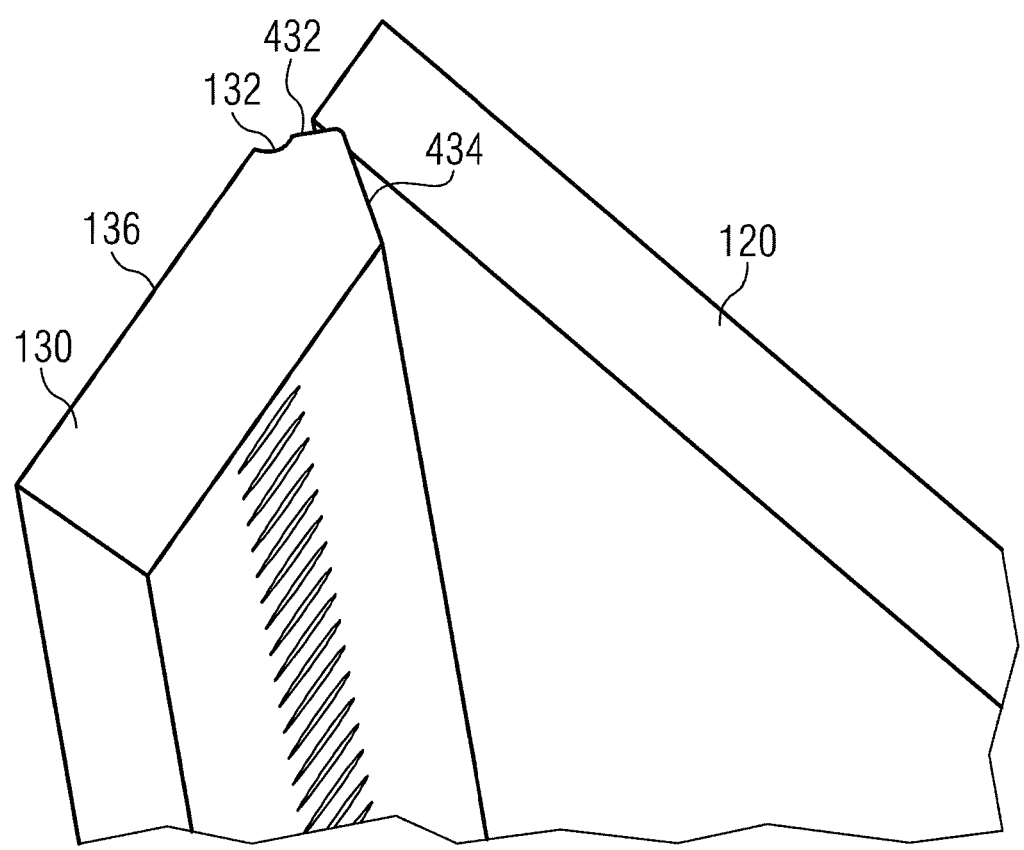
FIG. 4A shows a schematic partial view of a longitudinal flange before connecting the same to a shell of a tower section.

FIG. 4A shows a schematic partial view of a longitudinal flange 130 before connecting the same to a shell 120 of a tower section. In this respect, the longitudinal flange is arranged at a designated position along the shell 120 (here only part of the shell is shown which extends further than illustrated in FIG. 4A before separating) and will for example be connected to the shell 120 at a location 434 arranged at a side facing away from the contact surface 136 of the longitudinal flange by a welding seam. The longitudinal flange in FIG. 4 is arranged at the interior side of the shell 120, but may alternatively also be arranged at an exterior side of the shell 120. Optionally, after separating, a further welding seam may be generated at a location 432 arranged at a side facing the contact surface 136 of the longitudinal flange between the longitudinal flange and the shell 120.

For example, FIG. 4A shows a position of one half of the longitudinal flange with respect to a longitudinal member of the tower.

Figure 4B:
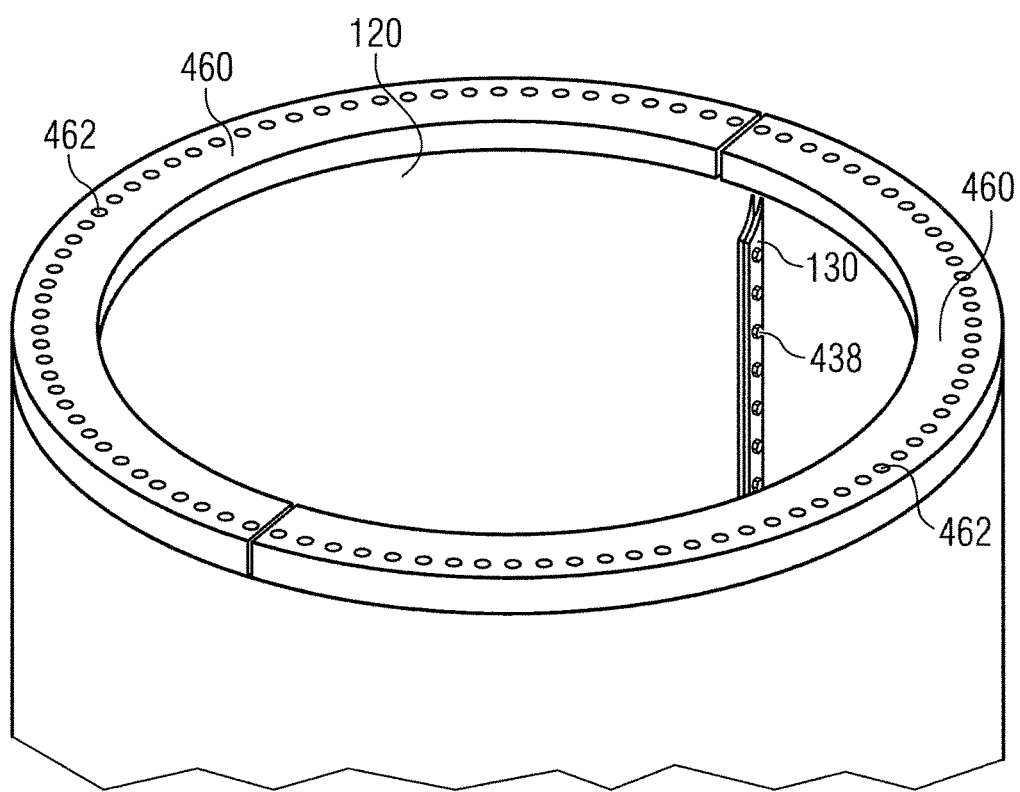
FIG. 4B shows schematic view of an end of a tower section after mounting two neighboring longitudinal flanges and before separating the shell.

FIG. 4B shows schematic view of an end of a tower section after mounting two neighboring longitudinal flanges 130 and before separating the shell 120. The longitudinal flanges 130 are for example connected to each other by screws 438 and may be disconnected again after separating the shell 120. At the top and/or bottom end of the shell 120 of the tower section transversal flanges 460 may be arranged for connecting to other tower sections or to a foundation. The transversal flanges 460 may be separated into several parts across the circumference of the tower section. For example, the transversal flanges 460 are divided at the same locations at which the shell 120 is separated along the longitudinal flanges 130. The transversal flanges 460 may comprise holes 462 for a later connection to other tower sections or to a foundation by screws.

For example, FIG. 4B shows an inclined view after screwing and welding the longitudinal flanges before separating the tower shell.

Figure 4C:
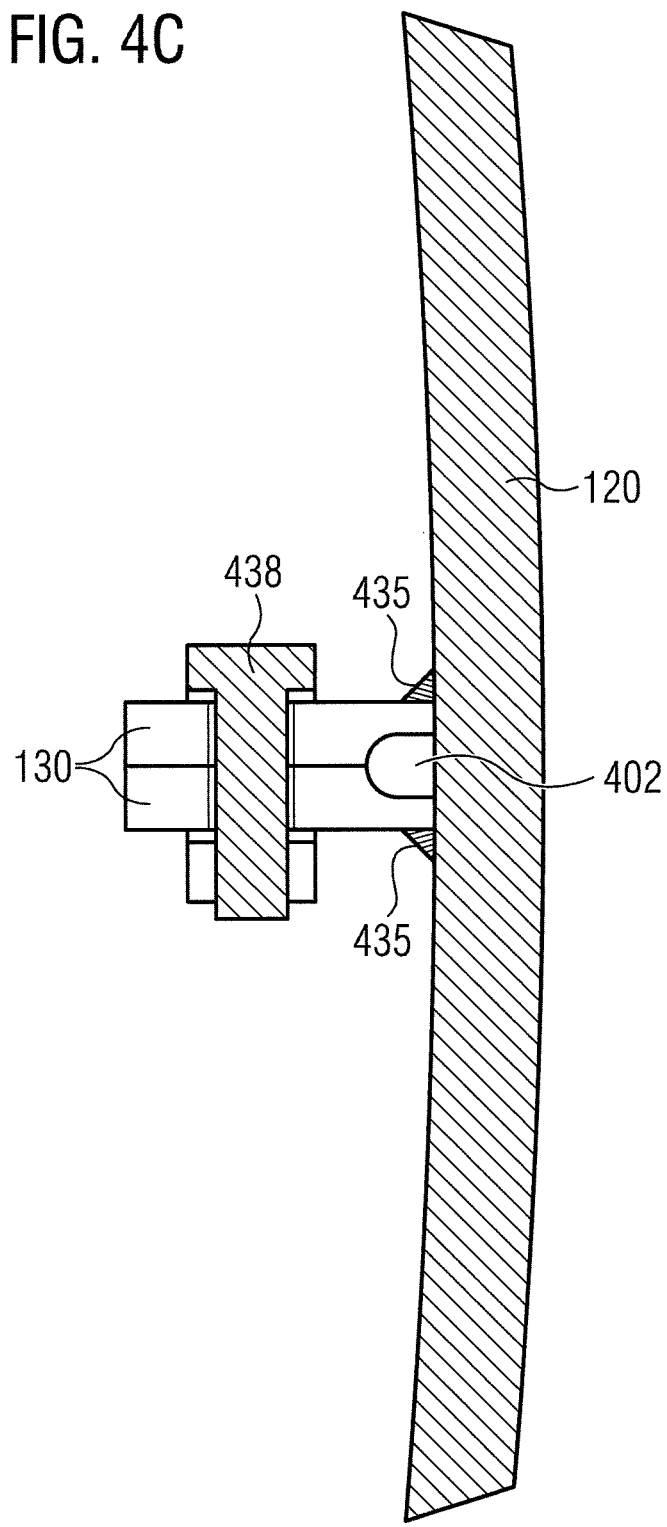
FIG. 4C shows a schematic cross section of two neighboring longitudinal flanges before separating the shell.

FIG. 4C shows a schematic cross section of two neighboring longitudinal flanges 130 before separating the shell 120. The two longitudinal flanges 130 are connected to the shell 120 via a welding seam 435. Further, the longitudinal flanges are connected to each other by screws 438. The longitudinal flanges 130 comprise undercut-shaped recesses at their ends facing the shell 130 so that between the longitudinal flanges 130 in the area of the shell 120 a gap 402 exists. The shell 120 may thus for example be separated along the gap (e.g. by a saw) without damaging the longitudinal flanges 130.

For example, FIG. 4C shows a cut after screwing and welding the longitudinal flanges 130 before separating the tower shell.

Figure 4D:
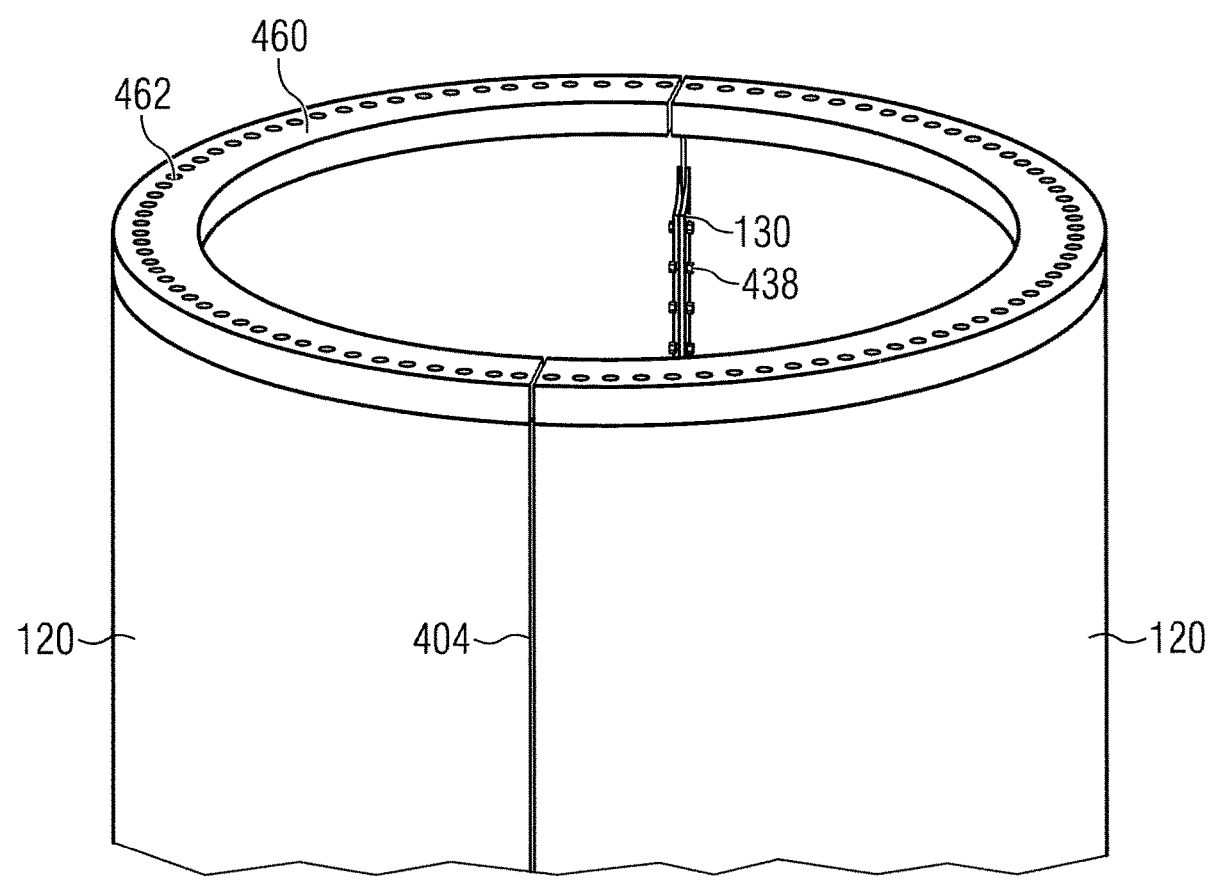
FIG. 4D shows a schematic view of an end of a tower section after separating the shell.

FIG. 4D shows a schematic view of an end of a tower section after separating the shell 120. By separating along the longitudinal flanges 130 a gap 404 results between the shell segments 120. The gap 404 between the shell segments 120 is for example smaller than or of the same width as a gap between the longitudinal flanges 130 at their ends facing the shell segments.

For example, FIG. 4D shows an inclined view after separating the tower shell.

Figure 4E:
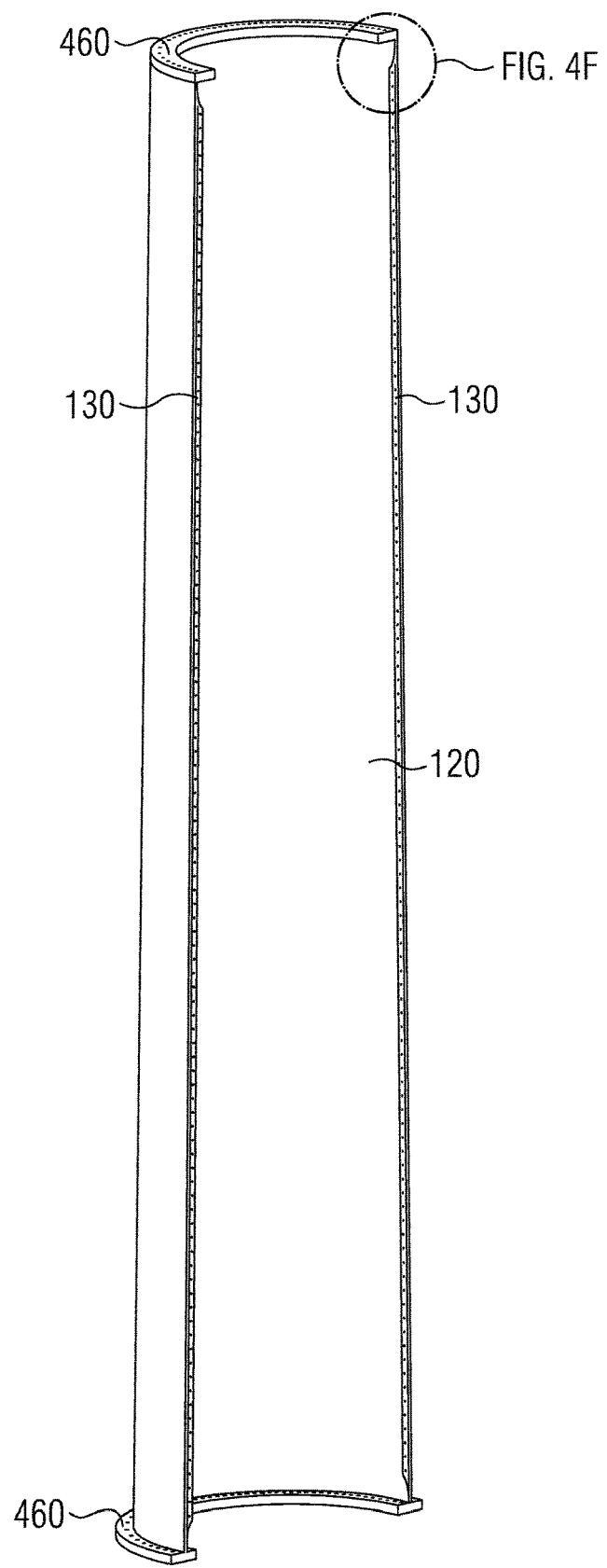
FIG. 4E shows a schematic view of a subsection of a tower section.

FIG. 4E shows a schematic view of a subsection of a tower section. For example, FIG. 4E shows an area of the divided tower shell 120 with completely welded longitudinal flanges 130.

Figure 4F:
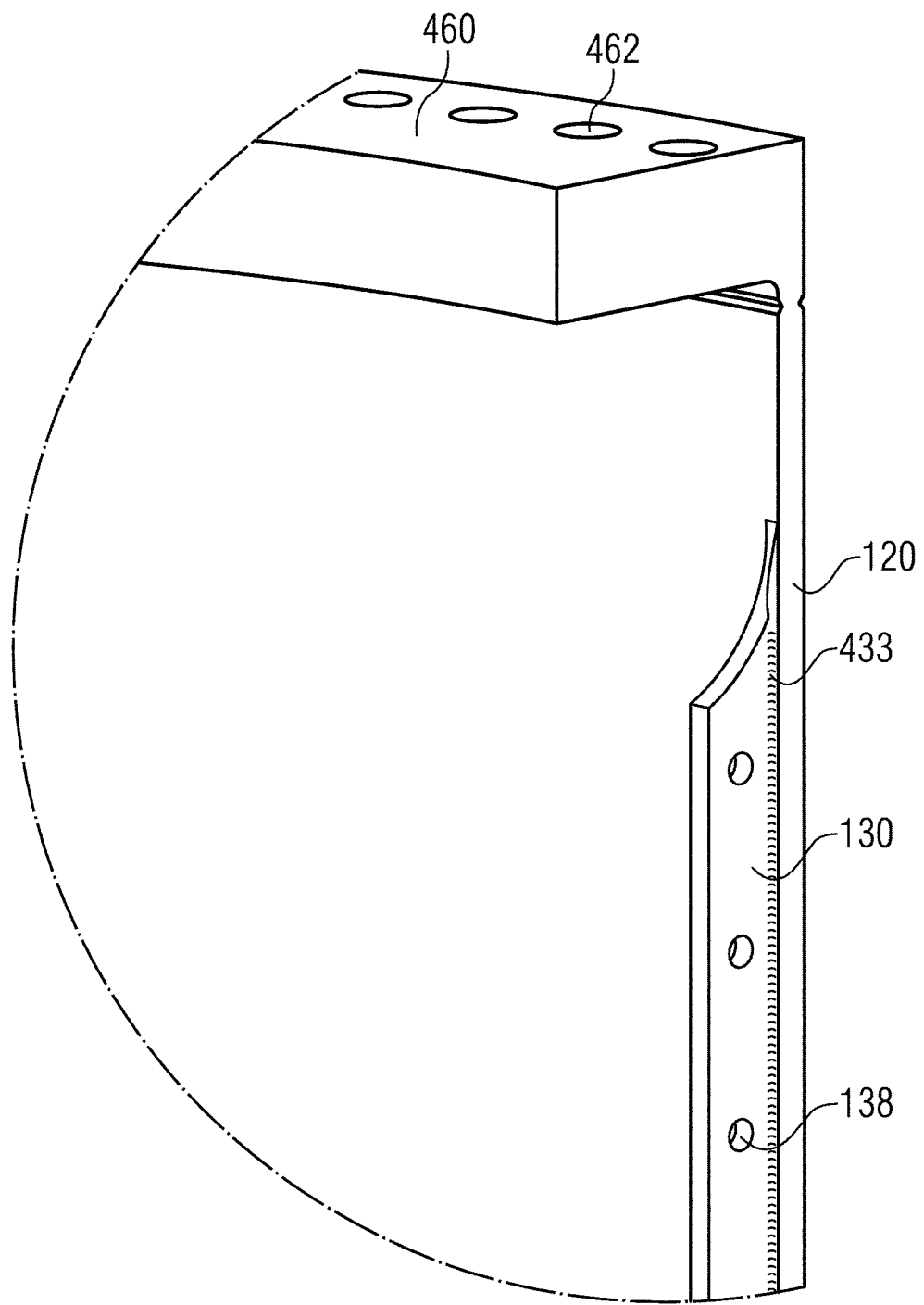
FIG. 4F shows a schematic view of a detail of the tower section of FIG. 4E.

FIG. 4F shows a schematic view of a detail of the tower section of FIG. 4E. After separating, the longitudinal flange 130 may be provided with a welding seam 433 also at the side with the undercut-shaped recess to improve the mounting of the shell 120. The longitudinal flange may end at a defined distance (e.g. more than 10 cm, more than 30 cm or more than 50 cm) to a top and/or bottom end of the longitudinal side of the shell 120, for example to facilitate a simple mounting of the transversal flange 460.

For example, FIG. 4F shows an enlargement of an area of the divided tower shell with completely welded longitudinal flanges (longitudinal seam visible in the area of the cutting surface).

FIG. 4G shows a schematic cross section of two neighboring longitudinal flanges 130 after separating the shell 120. By separating the shell 120 a gap results between the shell segments 120. Due to the undercut-shaped recesses 132 at the ends of the longitudinal flanges 130 the shell may be separated without damaging the longitudinal flanges 130 during separation. The subsections of the tower section may be separated from each other by detaching the screws 438 at the longitudinal flanges 130 and be provided to the location of assembly separately. At the location of assembly the subsections may again be connected to each other via the longitudinal flanges 130. It is further possible, after separating and detaching the screws, to apply an additional welding seam, wherein the section may again be assembled in the same way.

For example, FIG. 4G shows a cross-section after the assembly, without a representation of the seal.

FIGS. 5A-5D show examples for schematic cross sections of different implementations of neighboring longitudinal flanges 130 before separating the shell 120 (e.g. alternatives to the example shown in FIG. 4C).

Figure 5A:
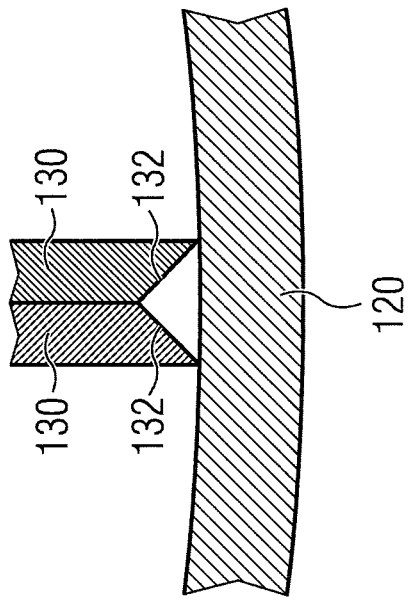
FIG. 5A-5D show examples for schematic cross sections of different implementations of neighboring longitudinal flanges before separating the shell.

FIG. 5A shows a schematic cross section of neighboring longitudinal flanges 130 before separating the shell 120. Here, the part 132 of the surface contour shows an erratic increase of the distance to the contacting plane from the contact surface between the longitudinal flanges 130 to the connecting surface with the shell 120. In other words, in cross-section the longitudinal flanges 130 comprise a square or rectangular recess, so that a rectangular or square gap exists between the longitudinal flanges already before the separation.

Figure 5B:
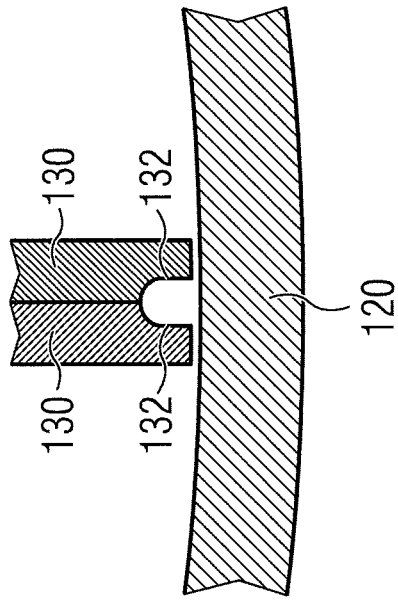

FIG. 5B shows a further schematic cross section of neighboring longitudinal flanges 130 before separating the shell 120. Here, the part 132 of the surface contour shows a linearly increasing distance to the contacting plane from the contact surface between the longitudinal flanges 130 to the connecting surface with the shell 120. In other words, in cross-section the longitudinal flanges 130 comprise a triangular, wedge-shaped or notch-shaped recess, so that a triangular gap exists between the longitudinal flanges already before the separation.

Figure 5C:
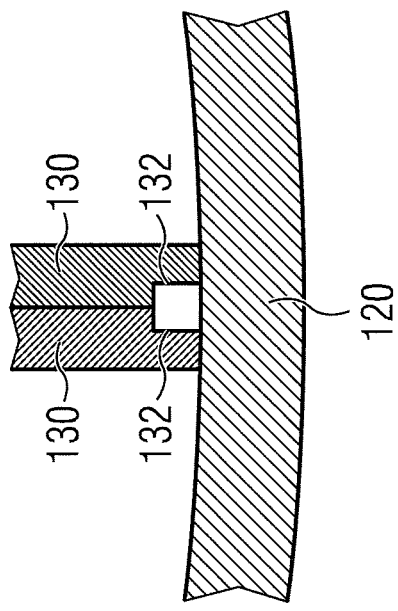

FIG. 5C shows a further schematic cross section of neighboring longitudinal flanges 130 before separating the shell 120. Here, the part 132 of the surface contour shows an increasing distance to the contacting plane from the contact surface between the longitudinal flanges 130 to the connecting surface with the shell 120. In cross-section the longitudinal flanges 130 comprise a quadrant-shaped or quarter ellipsis-shaped recess, so that a quadrant-shaped or quarter ellipsis-shaped gap exists between the longitudinal flanges already before the separation.

Figure 5D:
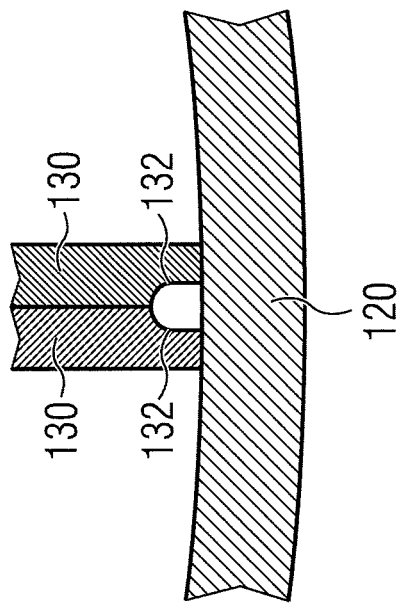

FIG. 5D shows a further schematic cross section of neighboring longitudinal flanges 130 before separating the shell 120. Here, the part 132 of the surface contour shows an initially increasing and then constant distance to the contacting plane from the contact surface between the longitudinal flanges 130 to the connecting surface with the shell 120. In cross-section the longitudinal flanges 130 comprise an initially quadrant-shaped or quarter ellipsis-shaped recess, so that initially a quadrant-shaped or quarter ellipsis-shaped gap exists between the longitudinal flanges already before the separation which then extends basically in parallel to the contacting plane to the shell 120. By this, for example, a deeper gap in comparison to FIG. 5C may be generated.

The gap illustrated in FIGS. 5A-5D exists again at the completely assembled tower, for example, as the two neighboring longitudinal flanges are only separated for transport and connected again at the location of assembly.

Figure 6:
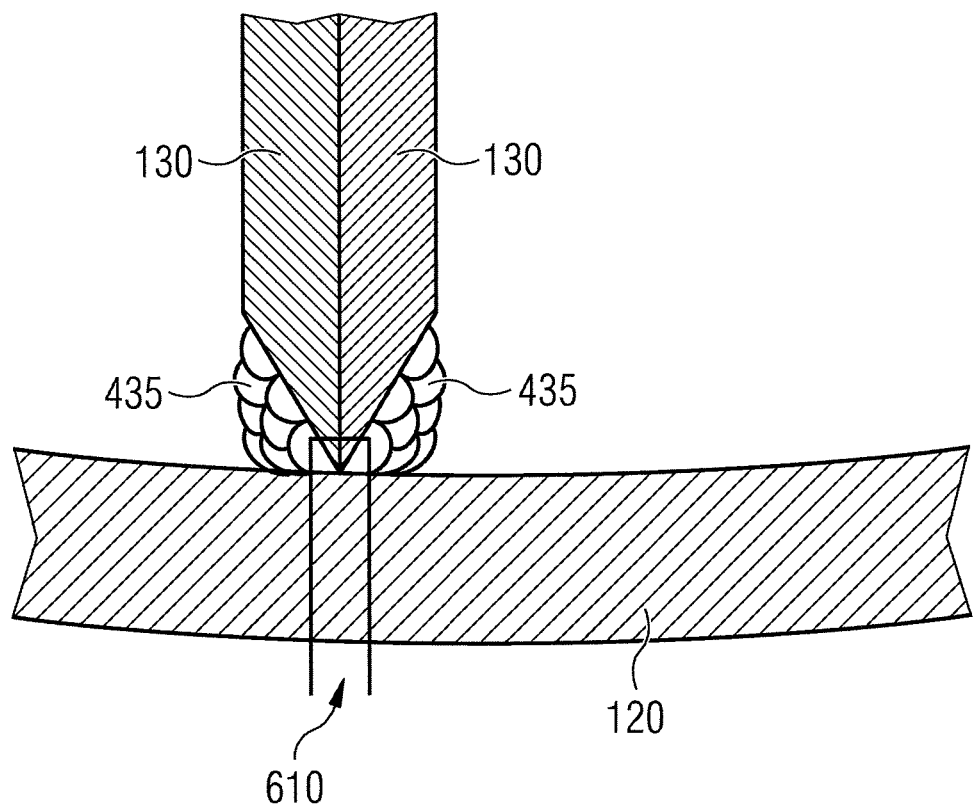
FIG. 6 shows a schematic cross section of two neighboring longitudinal flanges when separating the shell.

FIG. 6 shows a schematic cross section of two neighboring longitudinal flanges 130 when separating the shell 120. In this example, the longitudinal flanges 130 show no gap yet in the area of the shell 120 before separating the shell 120. The gap between the longitudinal flanges 130 is only generated by separating the shell. The two longitudinal flanges 130 comprise a clearly larger (e.g. more than 1.5 times larger or more than two times larger or more than 3 times larger) common thickness (sum of the thicknesses of the two longitudinal flanges) than a thickness of the separating tool 600 or a thickness of the gap resulting from the separation. The longitudinal flanges 130 are for example mounted to the shell 120 by welding seams. The longitudinal flanges may optionally comprise skewed ends to obtain a more stable welding connection to the shell 120.

FIG. 7 shows a flow chart of a method for manufacturing a tower section according to one embodiment. The method 700 includes (permanently) mounting 710 a first one-piece longitudinal flange for a first subsection of a tower section to a shell of the tower section and detachably connecting 720 a second one-piece longitudinal flange for a second subsection of the tower section to the first one-piece longitudinal flange for the first subsection after mounting the first one-piece longitudinal flange for the first subsection to the shell of the tower section, so that the two neighboring, one-piece longitudinal flanges are directly in contact with one another along a contact surface. Further, the method 700 comprises (permanently) mounting the second one-piece longitudinal flange for the second subsection of the tower section to the shell of the tower section, after detachably connecting the second one-piece longitudinal flange for the second subsection of the tower section to the first one-piece longitudinal flange for the first subsection. Additionally, the method 700 comprises separating the shell at least along the two neighboring, one-piece longitudinal flanges, wherein at least after separating a gap exists at the two neighboring, one-piece longitudinal flanges between the ends of the two neighboring, one-piece longitudinal flanges facing the shell.

Due to the possibility of generating a gap during separation or due to the existence of a gap already before separation separating the shell of the tower section may be clearly facilitated. Further, by the detachable connection after mounting the first longitudinal flange to the shell and before mounting the second longitudinal flange to the shell, the two longitudinal flanges may be attached to the shell better and more flush as compared to when the longitudinal flanges are already connected to each other before mounting the first longitudinal flange to the shell.

The gap between the ends of the two neighboring one-piece longitudinal flanges may already exist after mounting 730 the second one-piece longitudinal flange and before separating 740 at the ends of the two neighboring one-piece longitudinal flanges facing the shell. Alternatively, the shell may be separated so that the gap exists after separating 740 between the ends of the two neighboring, one-piece longitudinal flanges at the ends of the two neighboring, one-piece longitudinal flanges facing the shell.

For example, the method may further include detaching the detachable connection between the two neighboring, one-piece longitudinal flanges for a transportation to a destination of the tower. For manufacturing the tower with the tower section, the first and the second subsection of the tower section may be transported to a destination or location of assembly of the tower after detaching the detachable connection. At the destination or location of assembly of the tower, the first subsection and the second subsection may again be connected (e.g. by screws) detachably to each other via the first one-piece longitudinal flange of the first subsection and the second one-piece longitudinal flange of the second subsection For example, before mounting to the shell, the one-piece longitudinal flange for the first subsection (and/or the longitudinal flange for the second subsection) comprises a part of a surface contour extending from a contact surface of the longitudinal flange of the first subsection which is provided for a connection to the longitudinal flange of the second subsection to a connecting surface connected to the shell of the tower section. The part of the surface contour for example comprises a distance to a contacting plane passing through the contact surface.

Optionally, when mounting to the shell, the one-piece longitudinal flange for the first subsection may be mounted to the shell by a welding seam at a side facing away from the second longitudinal flange and/or at a side facing the second longitudinal flange. Further, during mounting to the shell, the one-piece longitudinal flange for the second subsection may be mounted to the shell by a welding seam at a side facing away from the first longitudinal flange. Optionally, after separating the shell and after detaching the detachable connection, the one-piece longitudinal flange of the second subsection may additionally be mounted to the shell by a welding seam at a side facing the first longitudinal flange.

More details and aspects are mentioned in connection with the embodiments described above or below. The embodiment shown in FIG. 7 may comprise one or more optional additional features corresponding to one or more aspects mentioned in connection with the proposed concept or one or more embodiments described above (e.g. FIG. 1-6) or below (e.g. FIG. 8A-8I).

FIG. 8A-8I show schematic cross sections of parts of a tower section at different stages during the manufacturing of the tower section according to one embodiment.

Figure 8A:
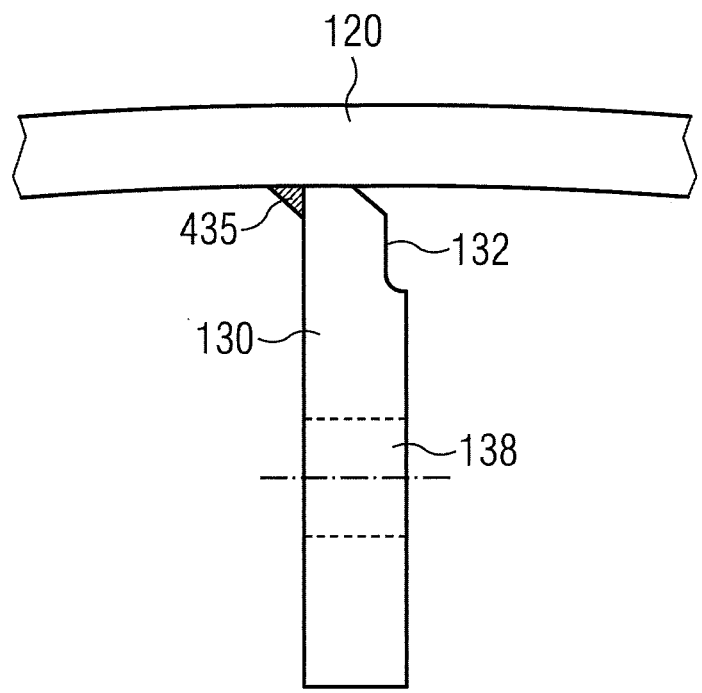
Figure 8B:
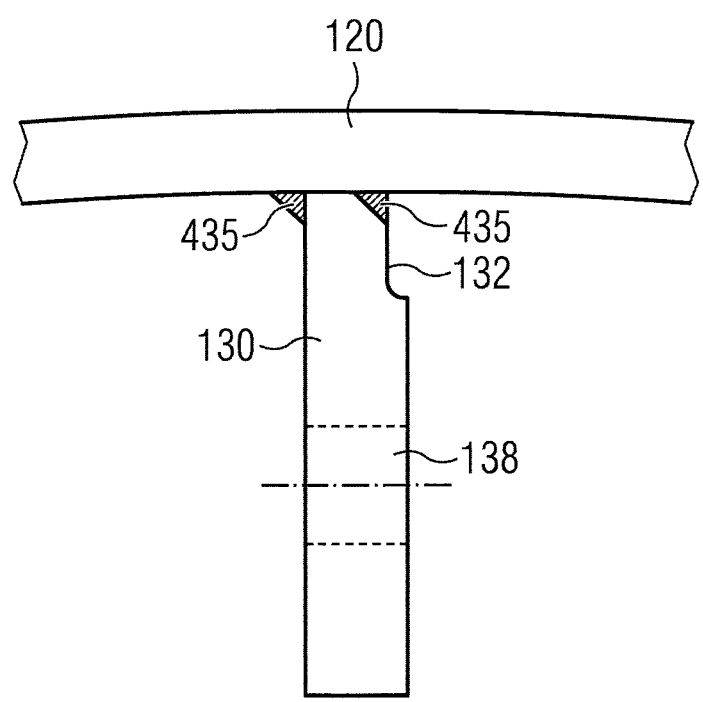

FIG. 8A shows a schematic partial view of a first one-piece longitudinal flange 130 after connecting the same to a shell 120 of a tower section. In this respect the first longitudinal flange 130 is arranged at a designated position along the shell 120 and for example mounted to a location at the shell 120 (longitudinal flange 1 weld in, exterior position) arranged at a side facing away from the contact surface of the longitudinal flange (for abutting a second longitudinal flange) by a welding seam 435. The longitudinal flange in FIG. 8A is arranged at the interior side of the shell 120 but may alternatively also be arranged at an exterior side of the shell 120. The first longitudinal flange comprises holes 138 for a connection to a second longitudinal flange. Further, the first longitudinal flange comprises an (undercut-shaped or notch-shaped) recess or taper 132 at an end facing the shell 120. Optionally, a further welding seam 435 may be generated at a location between the longitudinal flange and the shell 120 arranged at a side facing the contact surface of the longitudinal flange, as illustrated in FIG. 8B (longitudinal flange 1 welding counter-layer)

Figure 8C:
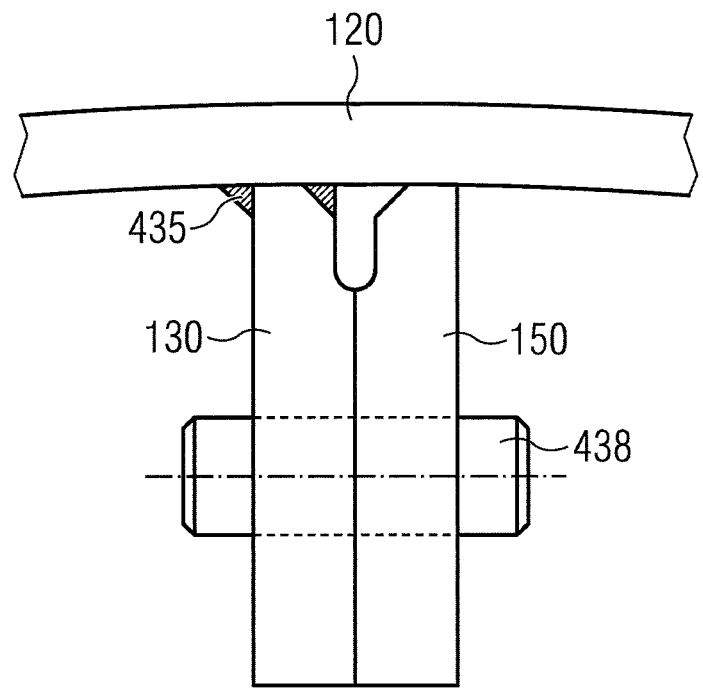

Afterwards a second one-piece longitudinal flange 150 of a second subsection of the tower section is detachably connected to the first one-piece longitudinal flange 130 of the first subsection after mounting the first one-piece longitudinal flange 130 of the first subsection to the shell of the tower section, so that the two neighboring, one-piece longitudinal flanges are directly in contact with one another along the contact surface, as illustrated in FIG. 8C. The detachable connection may for example be generated by screws 438 extending through the holes 138 in the longitudinal flanges (screw longitudinal flanges 1 and 2).

Figure 8D:
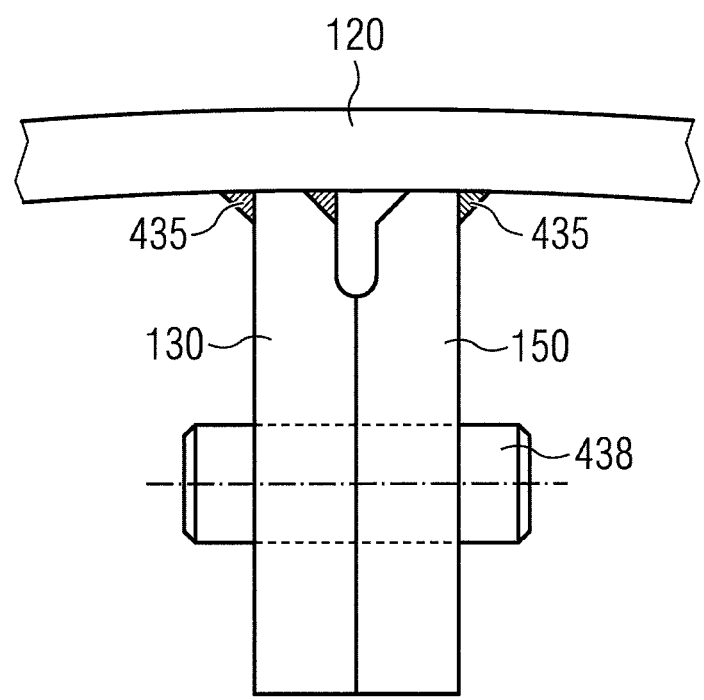

After detachably connecting the second one-piece longitudinal flange 150 of the second subsection of the tower section to the first one-piece longitudinal flange 150 of the first subsection, the second one-piece longitudinal flange 150 of the second subsection of the tower section may be mounted to the shell 120 of the tower section (e.g. via a welding seam at a side of the second longitudinal flange 150 facing away from the first longitudinal flange 130), as illustrated in FIG. 8D (weld longitudinal flange 2 exterior layer).

Figure 8E:
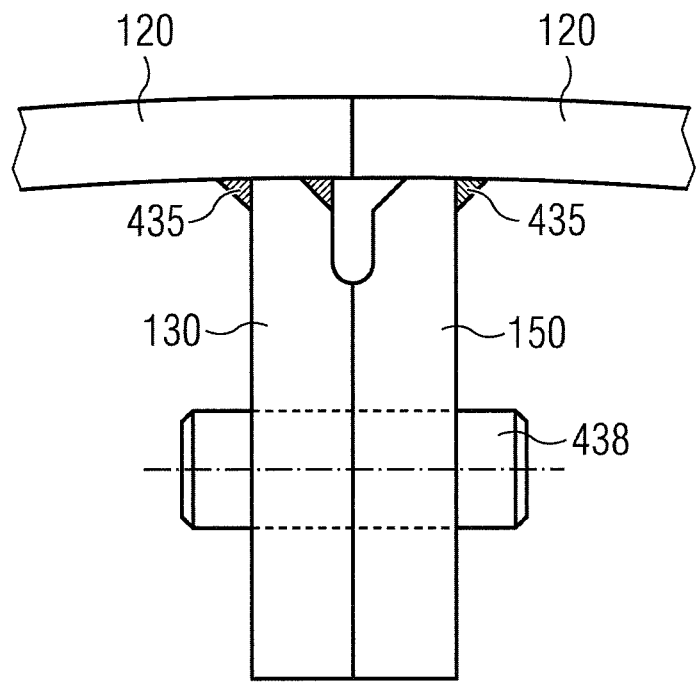

After mounting the second longitudinal flange 150 to the shell 120, the shell may be separated into at least two subsections (e.g. by sawing) along the two neighboring one-piece longitudinal flanges, as illustrated in FIG. 8E. As between the two longitudinal flanges at their end facing the shell 120 a gap already exists, separating may take place easily and without damaging the longitudinal flanges. Also after separating at the two neighboring, one-piece longitudinal flanges a gap exists between the ends of the two neighboring, one-piece longitudinal flanges facing the shell 120.

Figure 8F:
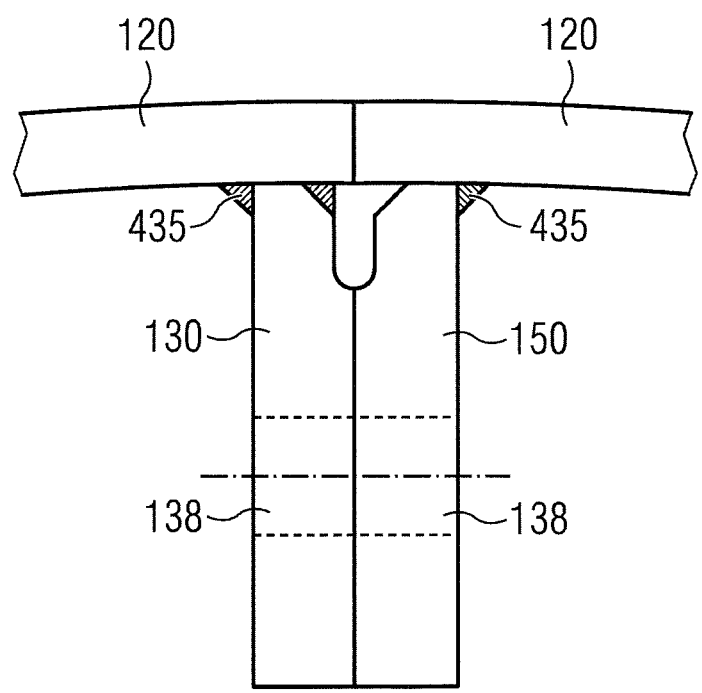

After separating the shell 120 into at least two shell segments and the consequently executed separation of the tower section into two subsections, the detachable connection of the two longitudinal flanges may be detached again as illustrated in FIG. 8F (detach screws and separate tower halves).

Figure 8G:
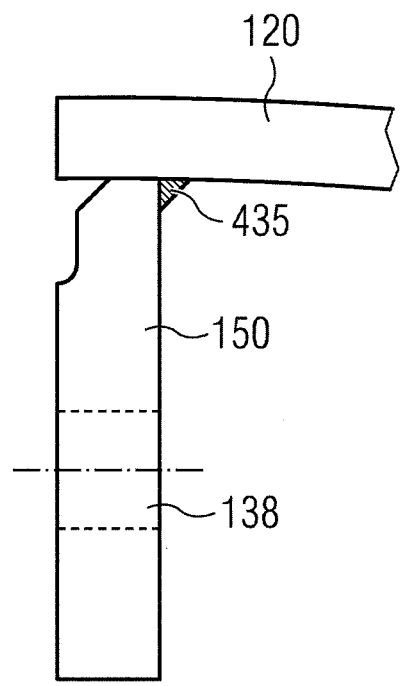
Figure 8H:
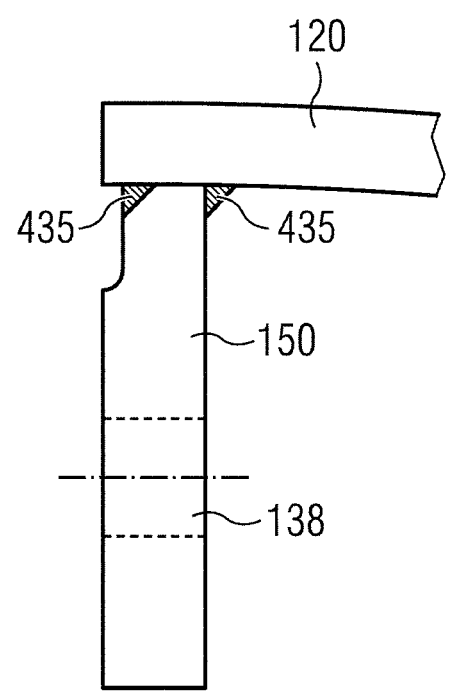

The at least two subsections may then be separated from each other as illustrated in FIG. 8G and be transported to the destination or location of assembly of the tower separately. Before that, optionally after separating the shell, at a side of the second longitudinal flange 130 which had before been facing the first longitudinal flange 130, the second longitudinal flange may be connected to the shell segment 120 of the second subsection by an additional welding seam 435 as illustrated in FIG. 8H (weld counter-layer of longitudinal flange 2).

After transport to the destination or location of assembly of the tower the at least two or more subsections of the tower section may again be assembled into one complete tower section by again connecting opposite longitudinal flanges (e.g. first and second longitudinal flange) (e.g. by screws), as illustrated in FIG. 8I.

Some embodiments relate to a tower section and methods for manufacturing a tower section.

A tower for wind energy plants may for example be presented particularly economically, if as few segments as possible are used with as little use of material. This may for example be achieved with respect to wind turbines with high hub heights if, for example, only the lower tower segment is separated longitudinally with as little effort as possible, for example by machining. To be able to guarantee stability, the parts of such a tower section have to be connected again after transport, e.g. by longitudinal flanges.

By simply separating the tower wall, as a consequence of removing material a gap results. Closing same without further measures might lead to a non-circular cross-section of the tower which may lead to problems when calculating and proving stability.

For example, for reasons of proving stability but also for reasons of manufacturing, longitudinal flanges may be welded. Would the same be applied after separating such a tower section, deformations of the tower structure may result due to heat input. If the flange pairs are already applied before separation, they may be damaged by the separation process. If the flange pairs are held at a distance by a spacer in order to generate a gap, the tower may later only be put together using this spacer which would cause additional costs.

According to the proposed concept, with an undercut in the area of the longitudinal flange pairs an improvement of stability, facilitated transport and/or easier assembly and/or manufacturing may be enabled. It may thus be possible to realize the tower so that material removed during manufacturing may be filled up by using a sealant or sealing element and so that the longitudinal flange pairs are in direct contact without them being damaged when separating the tower shell.

For example, based on the proposed concept an undercut-shaped recess or a gap may be used which may e.g. serve as a welding seam preparation for a welding layer at the connection longitudinal flange—interior of tower shell to be applied after separating, which may serve as a support regarding orientation during separation and/or enable a complete separation without additional members (e.g. spacers).

The gap (undercut-shaped recess) may for example be generated in two different ways, either before separating or by separating. The same may take on different shapes, e.g. circular, rectangular, triangular with an additional phase or result from the shape of the cutting tool.

Background is, for example, the rework regarding corrosion protection. If the gap is generated before separating, this way e.g. at the interior a welding seam may be applied without the longitudinal flanges diverging. If the gap is generated by the separation, a complete separation may be possible without excessive requirements set with respect to operating accuracy. As the welding seam between the longitudinal flange and the shell may be completely welded through, e.g. no additional reworks are required (e.g. apart from sealing in case of all variants for protecting the gap in the shell).

E.g., a longitudinal flange may be applied by welding. The interior seam may be applied subsequently. Further, a separation of the tower section may be executed by dividing the conical/cylindrical tube from the outside by sawing, milling, lasing, water jet cutting, burn-cutting or eroding. Here, the tower may be held together by screwed longitudinal flanges. The gap resulting from the separation may be smaller than the existing gap at the longitudinal flanges (due to the undercut-shaped geometry of the flanges) to form a space for the separating tool. For example, the gap may be approx. 5-20 mm. Further, the separated tower section may be sealed. For example, a sealant (e.g. deformable plastics like silicone) may be applied in the area of the transversal flanges and/or a T-profile of plastics or the like may be used for sealing the gap of the longitudinal flange.

Some embodiments relate to a hollow cylindrical or hollow truncated cone-shaped tower section comprising at least two components of big volume connected to each other by longitudinal flange pairs wherein the components together form the outer shell of the tower section and are connectable to a foundation and/or to a further tower section via at least one ring flange and/or at least one ring flange segment. The outer shell may here comprise at least one gap in the area of the longitudinal flange pairs. Further, the longitudinal flange pairs may each comprise an undercut-shaped recess and the longitudinal flanges may be connected to each other in direct contact by connecting means.

According to one aspect, the at least one gap in the outer shell may be filled up by at least one sealant in the area of the longitudinal flanges. For example, the sealant may comprise at least one T-profile.

According to a further aspect, the connection of the longitudinal flange pair may comprise at least one screw connection.

Optionally, the longitudinal flange pairs may end towards the at least one ring flange and/or the at least one ring flange segment. Optionally, the tower section may also comprise several one-piece longitudinal flanges which are adjacent to each other in a longitudinal direction.

The tower section may optionally comprise a door opening.

Some embodiments relate to a method for manufacturing a hollow cylindrical or hollow truncated cone-shaped tower section (e.g. according to one of the above described examples). The method includes, for example, manufacturing a tower shell with the shape of a hollow cylindrical or hollow truncated cone-shaped tube having at least one attached ring flange component and joining at least two longitudinal flange pairs connected to each other in direct contact which comprise and undercut-shaped recess or a gap with the hollow cylindrical or hollow truncated cone-shaped tube. Further, the method may comprise separating the tower shell into at least two components and detaching the longitudinal flange pairs. The at least two components may be connected at the set-up location of the tower.

Optionally, manufacturing the tower shell may include at least one rolling process and joining the at least one ring flange component may include at least one welding process.

According to one aspect, the at least one ring flange component may be separated into at least two parts before manufacturing the hollow cylindrical or hollow truncated cone-shaped tube.

Optionally, before and/or after manufacturing a tower shell, at least one longitudinal flange pair comprising an undercut-shaped recess or a gap, may be connected in direct contact by screwing, riveting, jamming or welding.

Additionally, manufacturing the tower shell may include at least partially applying corrosion protection.

According to one aspect, joining the at least two longitudinal flange pairs connected to each other in direct contact with the hollow cylindrical or hollow truncated cone-shaped tube may include welding. Here, welding the at least two longitudinal flange pairs connected to each other in direct contact with the hollow cylindrical or hollow truncated cone-shaped tube may include seam preparation.

Optionally, before separating the tower shell fixing means for securing the shape of the tower shell may be attached.

According to one aspect, separating the tower shell into at least two components may be done by sawing, milling, lasing, water jet cutting, burn-cutting or eroding.

Optionally, after detaching the longitudinal flange pair a further welding process and/or weld reworking may be executed.

Additionally, joining the at least two components at the set-up location of the tower may be done by screwing, riveting, jamming and/or welding along the longitudinal flanges.

Features disclosed in the above description, the following claims and the included figures may both individually and also in any combination be implemented and of importance for the realization of an example in different implementations.

Although some aspects were described in connection with a device, it is obvious that these objects may also represent a description of a corresponding method, so that a block or a member of a device may also be regarded as a corresponding process or as a feature of a process.

Analogously, aspects described in the context of or as a process also represent a description of a corresponding block or detail or feature of a corresponding device.

One example may thus be implemented as a program comprising a program code for executing a method according to one example, when the program is executed on a programmable hardware component. The individual processes may here be acquired by controlling corresponding actuators, reading out memory locations or other data sources, numeric and other manipulations of data and other processes. Within the scope of such a program but also within the scope of different implementations of a method according to one example, the individual processes may thus, for example, include generating, providing and, if applicable, receiving control signals, sensor signals and other signals. Transmitting may also include writing or storing a value into a memory location or a register. Accordingly, reading out or receiving may also include a corresponding reading out of a register or a memory location. These signals may, for example, be transmitted as electrical, optical or radio-technical signals and be implemented continuously or discretely independent from one another regarding their signal values and their temporal implementation. The corresponding signals may, for example, include analog signals but also digital signals.

The above described examples merely represent an illustration of the principles of the present invention. It is obvious that modifications and variations of the arrangements and details described herein are obvious for other persons skilled in the art. It is intended that the invention is only limited by the scope of the following claims and not by the specific details which were presented herein using the description and the explanation of the examples herein.

Features disclosed in the above description, the following claims and the included figures may both individually and also in any combination be implemented and of importance for the realization of an example in different implementations.

REFERENCE SIGNS 100 subsection of a tower section
102 subsection of a tower section
106 contacting plane
120 shell, shell segment
130 longitudinal flange
132 part of a surface contour of the longitudinal flange
134 connecting surface
136 contact surface
138 hole
150 longitudinal flange
160 sealing element
200 wind turbine
210 tower section
220 tower section
230 machine house
240 rotor
300 method for manufacturing at least one subsection
310 mounting two neighboring longitudinal flanges
320 separating the shell
402 gap between longitudinal flanges
404 gap between shell segments
432 location arranged facing the contact surface of the longitudinal flange
433 welding seam
434 location arranged facing away from the contact surface of the longitudinal flange
435 welding seam
438 screw
460 transversal flange
462 hole
610 separating tool
700 method for manufacturing a tower section
710 mounting a first one-piece longitudinal flange
720 detachably connecting a second one-piece longitudinal flange of a second subsection of the tower section to the first one-piece longitudinal flange
730 mounting the second one-piece longitudinal flange
740 separating the shell

The invention claimed is:

1. A method for manufacturing at least a subsection of a tower section,
the subsection comprising two neighboring, one-piece longitudinal flanges and a shell, wherein the two neighboring, one-piece longitudinal flanges each comprise a surface contour that transitions between a shell-facing edge to a transverse edge with a contact surface,
the method comprising:
mounting the two neighboring, one-piece longitudinal flanges to the shell of the tower section,
so that the two neighboring, one-piece longitudinal flanges are directly in contact with one another along the contact surfaces,
wherein, after mounting, a gap is created with boundaries comprising the shell and the surface contours of the two neighboring, one-piece longitudinal flanges; and
separating the shell at least along a contacting plane passing between the contact surfaces, wherein the contacting plane extends through the gap between the two neighboring, one-piece longitudinal flanges.

2. The method according to claim 1, wherein the two neighboring longitudinal flanges are connected to each other by a detachable connection during separation of the shell.

3. The method of claim 1, wherein the surface contours and the subsequent gap extend substantially along the entire longitudinal axis of the flanges.

4. A method for manufacturing a tower section,
the tower section comprising a first one-piece longitudinal flange of a first subsection of the tower section, a second one-piece longitudinal flange of a second subsection of the tower section, and a shell, wherein:
both the first and the second one-piece longitudinal flanges comprise a shell-facing edge and a transverse edge with a contact surface; and
at least the first one-piece longitudinal flange comprises a surface contour that transitions between the shell-facing edge to the transverse edge,
the method comprising:
mounting the shell-facing edge of the first one-piece longitudinal flange to the shell of the tower section by a welding seam at a vertex with the surface contour;
detachably connecting the second one-piece longitudinal flange to the first one-piece longitudinal flange, so that the two neighboring, one-piece longitudinal flanges are directly in contact with one another along the contact surfaces;
mounting the shell-facing edge of the second one-piece longitudinal flange to the shell of the tower,
wherein, after the mounting of the second one-piece longitudinal flange, the surface contour creates a gap between the ends of the two neighboring, one-piece longitudinal flanges mounted to the shell; and separating the shell at least along a contacting plane passing between the contact surfaces through the gap and the shell.

5. The method according to claim 4, further comprising detaching the detachable connection between the two neighboring, one-piece longitudinal flanges for transporting to a destination of the tower.

6. The method according to claim 4, wherein the surface contour comprises a part of a surface contour extending from the contact surface of the first one-piece longitudinal flange which is provided for a connection to the second one-piece longitudinal flange to a connecting surface connected to the shell of the tower section, wherein the part of the surface contour comprises a distance to the contacting plane passing between the contact surfaces.

7. The method according to claim 4, wherein the shell-facing edge of the first one-piece longitudinal flange is additionally mounted to the shell by a welding seam at a vertex opposite the vertex with the surface contour.

8. The method according to claim 4, wherein the shell-facing edge of the second one-piece longitudinal flange is mounted to the shell by a welding seam at a vertex with a side facing away from the first longitudinal flange.

9. The method according to claim 8, wherein after separating the shell and after detaching the detachable connection, the shell-facing edge of the second one-piece longitudinal flange is additionally mounted to the shell by a welding seam at vertex with a side facing the first longitudinal flange.

10. The method of claim 4, wherein the second one-piece longitudinal flange comprises a surface contour that transitions between the shell-facing edge to the transverse edge with the contact surface.

11. The method according to claim 10, wherein after separating the shell and after detaching the detachable connection, the shell-facing edge of the second one-piece longitudinal flange is additionally mounted to the shell by a welding seam at a vertex with the surface contour of the second one-piece longitudinal flange.

* * * * *

UNITED STATES PATENT AND TRADEMARK OFFICE
CERTIFICATE OF CORRECTION

PATENT NO. : 11,332,952 B2
APPLICATION NO. : 16/836962
DATED : May 17, 2022
INVENTOR(S) : Karsten Porm et al.

It is certified that error appears in the above-identified patent and that said Letters Patent is hereby corrected as shown below:

In the Claims

Column 16, Line 65 (Claim 4), the text reading -shell of the tower,- should be changed to --shell of the tower section,--.

Signed and Sealed this
Eighteenth Day of October, 2022

Katherine Kelly Vidal
*Director of the United States Patent and Trademark Office*